United States Patent
Morgan

[11] Patent Number: 6,014,837
[45] Date of Patent: Jan. 18, 2000

[54] ADAPTABLE PLANT PROTECTOR

[76] Inventor: Wayne Morgan, 3510 Main St., Soquel, Calif. 95073

[21] Appl. No.: 09/109,964

[22] Filed: Jul. 2, 1998

[51] Int. Cl.[7] .................................................. A01G 13/00
[52] U.S. Cl. ................................................ 47/31; 135/125
[58] Field of Search ................................ 47/26, 28.1, 29, 47/31; 135/117, 125, 155; 473/421; 273/410

[56] References Cited

U.S. PATENT DOCUMENTS

| | | | |
|---|---|---|---|
| 2,401,997 | 6/1946 | Whitman | 47/31 |
| 2,598,588 | 5/1952 | Mullen | 135/155 |
| 2,828,758 | 4/1958 | Moro | 135/155 |
| 2,961,802 | 11/1960 | Mongan et al. | |
| 3,013,801 | 12/1961 | Kirkconnell, Jr. | 473/421 |
| 3,482,609 | 12/1969 | Neckerman | 47/31 |
| 4,739,784 | 4/1988 | Fast | 135/117 |
| 5,056,172 | 10/1991 | Kaiser et al. | 5/417 |
| 5,059,463 | 10/1991 | Peters . | |
| 5,519,965 | 5/1996 | Robinson . | |
| 5,611,380 | 3/1997 | Landy . | |
| 5,692,534 | 12/1997 | Brumfield | 135/117 |

FOREIGN PATENT DOCUMENTS

| | | | |
|---|---|---|---|
| 2176682 | 1/1987 | United Kingdom | 47/28.1 |

Primary Examiner—Michael J. Carone
Assistant Examiner—Jeffrey L. Gellner
Attorney, Agent, or Firm—Jack Lo

[57] ABSTRACT

An adaptable plant protector includes a flexible shield and a pair of bendable supporting rods. The shield is comprised of a springy frame spanned by a flexible sheet, and rings attached around the sheet. The shield is supported over a plant by inserting the top ends of the rods through the rings, and the bottom ends into the ground. Each rod is provided with a stop at an intermediate position for supporting the shield off the ground. The rods may be positioned closer together for holding the shield in an arc shape, or farther apart for holding it flat. The rods can also be bent to support the shield in many different shapes and positions for protecting plants in a variety of landscaping and horticultural situations. Gardening staples may be used instead of the rods for attaching edges of the shield directly to the ground in some situations. In a second embodiment, the shield is comprised of a springy frame spanned by a coarse mesh. The bendable rods are inserted directly through the coarse mesh. An alternative spiral supporting rod may be screwed it into the mesh. In either embodiment, the shield can be compacted by coiling the springy frame.

8 Claims, 3 Drawing Sheets

ADAPTABLE PLANT PROTECTOR

BACKGROUND OF THE INVENTION

1. Field of the Invention

This invention relates generally to shields and covers for protecting plants.

2. Prior Art

Some outdoor plants must be protected from weather and animals, such as deer and birds. The prior art includes a variety of devices for providing such protection. One such device is shown in U.S. Pat. No. 5,519,965 to Robinson. It includes a flexible sheet reinforced with a pair of rods at opposite ends. The sheet is suspended by rigid poles positioned through a ring in each rod. However, its mounting is limited to a single horizontal position directly over the plants, and the poles must be positioned at a set distance apart, so that it cannot be used in some landscaping and horticultural situations where there are space constraints.

Other types of flexible shades or panels for non-horticultural use are also known. U.S. Pat. No. 5,611,380 to Landy shows a collapsible sunshade comprised of a flexible frame spanned by a flexible opaque sheet, and loops attached to opposite sides of the frame. It is for being mounted on a side of an automobile by connecting the loops to hooks and suspension rods attached to the automobile. U.S. Pat. No. 5,116,273 to Chan shows a collapsible mat for the beach. It includes a flexible ring spanned by a flexible sheet, and loops attached around the rim of the sheet. The sheet is attached to the ground by stakes inserted through the loops. A hole surrounded by an elastic band is positioned at the center of the sheet for passing an umbrella. Neither the Landy device nor the Chan device can be positioned off the ground over plants. U.S. Pat. No. 2,961,802 to Mongan et al. shows a structural unit also comprised of a flexible frame spanned by a flexible sheet. It is limited to a single arched position, and includes no simple provision for mounting over plants.

OBJECTS OF THE INVENTION

Accordingly, objects of the present adaptable plant protector are:

to protect plants from weather and animals;
to be easily mounted in a variety of positions for protecting plants in a variety of landscaping; and
horticultural situations; and
to be collapsible for compact shipment and storage.

Further objects of the present invention will become apparent from a consideration of the drawings and ensuing description.

BRIEF SUMMARY OF THE INVENTION

An adaptable plant protector includes a flexible shield and a pair of bendable supporting rods. The shield is comprised of a springy frame spanned by a flexible sheet, and rings attached around the sheet. The shield is supported over a plant by inserting the top ends of the rods through the rings, and the bottom ends into the ground. Each rod is provided with a stop at an intermediate position for supporting the shield off the ground. The rods may be positioned closer together for holding the shield in an arc shape, or farther apart for holding it flat. The rods can also be bent to support the shield in many different shapes and positions for protecting plants in a variety of landscaping and horticultural situations. Gardening staples may be used instead of the rods for attaching edges of the shield directly to the ground in some situations. In a second embodiment, the shield is comprised of a springy frame spanned by a coarse mesh. The bendable rods are inserted directly through the coarse mesh. An alternative spiral supporting rod may be screwed into the mesh. In either embodiment, the shield can be compacted by coiling the springy frame.

DRAWING REFERENCE NUMERALS

| | |
|---|---|
| 10. Shield | 11. Bendable Rods |
| 12. Springy Frame | 13. Flexible Sheet |
| 14. Rings | 15. Stops |
| 16. Plant | 17. Gardening Staples |
| 18. Shield | 19. Bendable Rods |
| 20. Springy Frame | 21. Flexible Sheet |
| 22. Stops | 23. Spiral Rod |

DETAILED DESCRIPTION OF THE INVENTION

Figure 1:
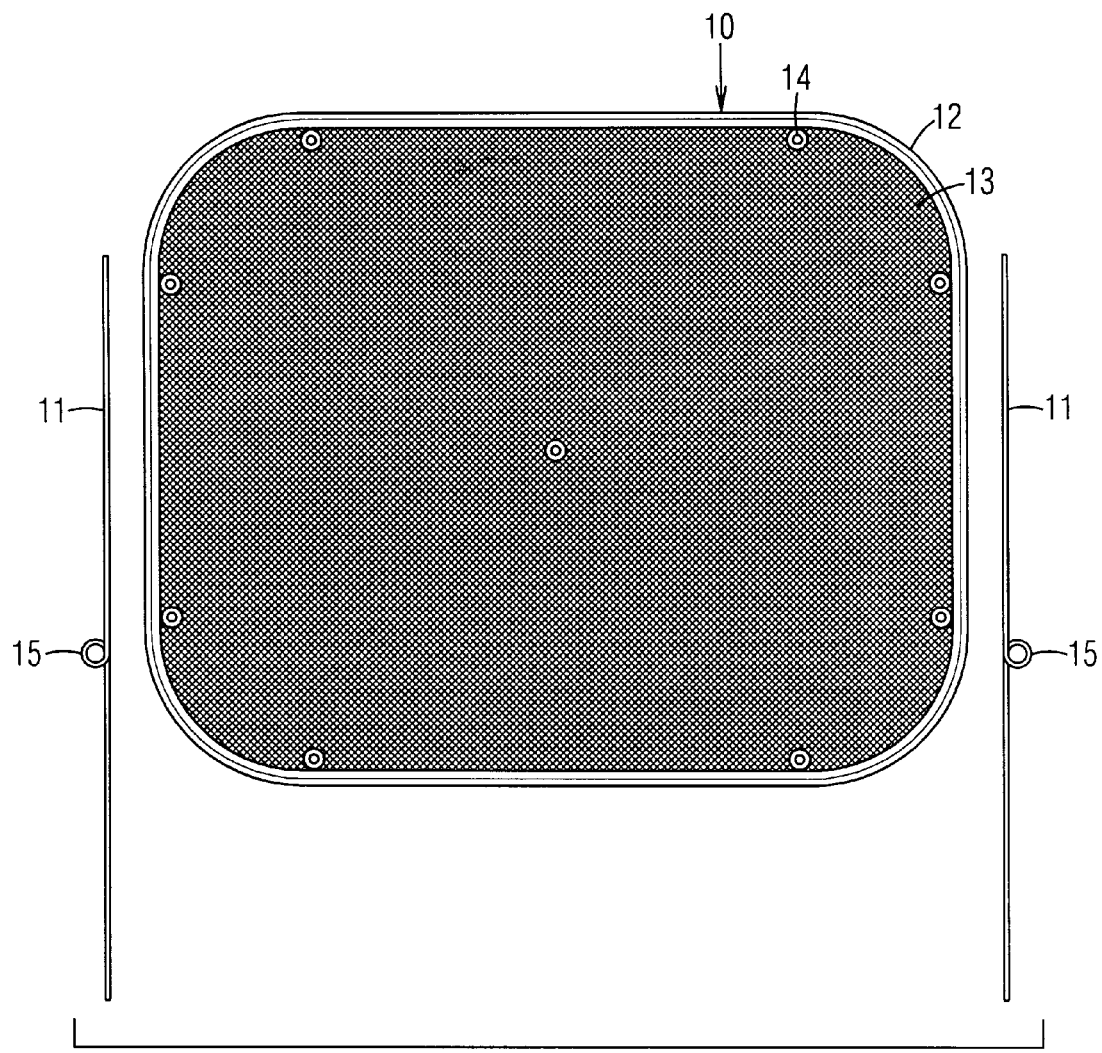
FIG. 1 is a front view of a first embodiment of the adaptable plant protector.

FIGS. 1–2:

A first embodiment of the adaptable plant protector is shown in a front view in FIG. 1. It includes a flexible shield 10 and a pair of attaching means or bendable supporting rods 11. Shield 10 is comprised of a springy frame 12 spanned by a flexible sheet 13. Frame 12 is preferably comprised of a fabric-covered spring rod that springs back to its original shape after being bent, twisted, or coiled. Sheet 13 must be strong enough to protect a plant from animals and weather, but it is preferably a fine mesh with holes on about 20% to 70% of its surface to provide the plant with sufficient sunlight and fresh air. A plurality of grommets or rings 14 are attached around the periphery of shield 10. A ring 14 is also attached through the center of shield 10. The top ends of bendable supporting rods 11 are for being removably inserted through rings 14, and the lower ends are for being inserted into the ground. Rods 11 are preferably made of a material which is relatively easy to bend, but still stiff enough to retain its shape. Each rod 11 is formed with a stop 15 that divides it into upper and lower sections. Stop 15 is larger than the openings of rings 14 to support shield 10 off the ground. Stop 15 is preferably provided as a loop with a large enough radius to enable the divided sections of rod 11 to be easily bent about it.

Figure 2:
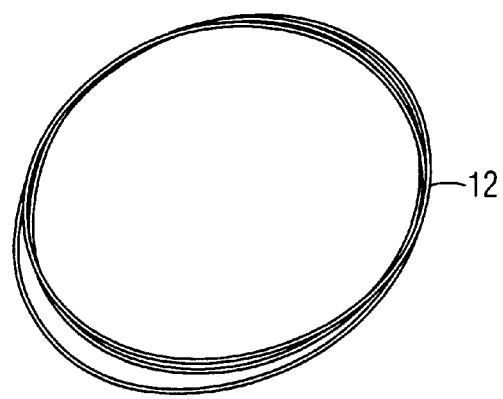
FIG. 2 is a front view of the plant protector in a coiled, compacted position.

The shield is shown in FIG. 2 coiled into a compact shape for shipping and storage. For clarity, only frame 12 is shown.

The frame will automatically spring back to its expanded shape when the coil is pulled apart.

FIGS. 3–7:

The plant protector is shown in exemplary installations over a plant in FIGS. 3–7 for protecting it from animals and weather, such as strong sun, wind, hale, etc.

Figure 3:
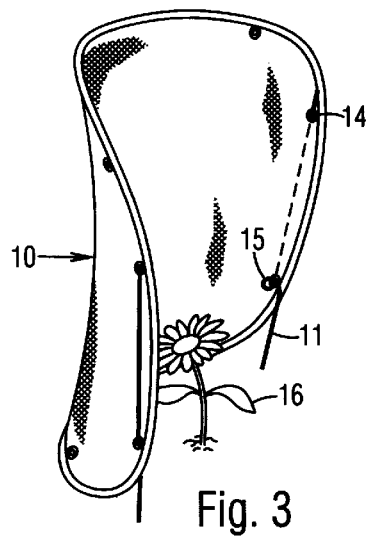
FIG. 3 is a side perspective view of the plant protector in an exemplar installation.

In FIG. 3, shield 10 is bent into a semi-cylindrical shape and supported next to a plant 16. Rods 11 are kept straight and inserted into respective pairs of adjacent rings 14 on opposite edges of shield 10 until stops 15 are engaged against lower rings 14. Rods 11 are inserted into the ground close enough together to retain shield 10 in the semi-cylindrical shape.

Figure 4:
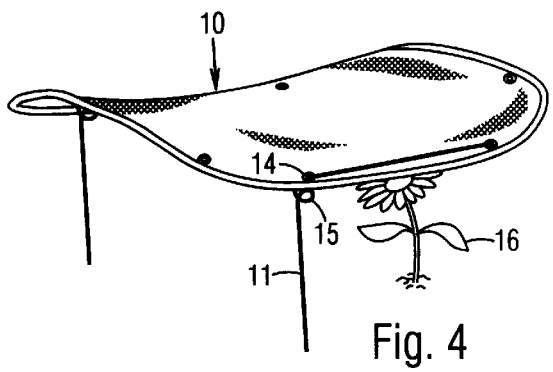
FIG. 4 is a side perspective view of the plant protector in another exemplar installation.

In FIG. 4, shield 10 is positioned horizontally over plant 16. Rods 11 are bent about loops or stops 15 so that its upper and lower sections are perpendicular to each other, and inserted into respective pairs of adjacent rings 14 on opposite edges of shield 10 until stops 15 are engaged against corresponding rings 14. Rods 11 are inserted into the ground far enough apart to retain shield 10 in a flat position.

Figure 5:
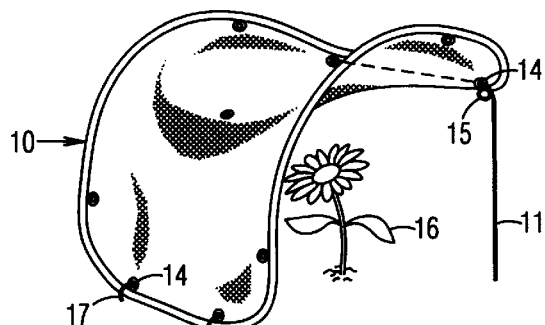
FIG. 5 is a side perspective view of the plant protector in another exemplar installation.

In FIG. 5, shield 10 is bent into an arc and positioned at the front of plant 16. The low front edge of shield 10 is directly attached to the ground by attaching means or conventional gardening staples 17 positioned through rings 14. The high rear edge of shield 10 is supported by a rod 11 bent into a right angle about stop 15 and inserted through adjacent rings 14. Rod 11 is inserted into the ground close enough to the front edge of shield 10 to retain shield 10 in the arc shape.

Figure 6:
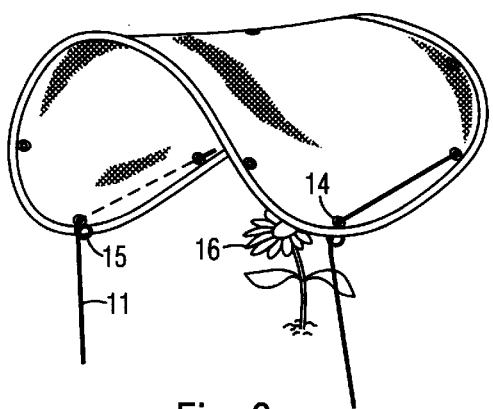
FIG. 6 is a side perspective view of the plant protector in another exemplar installation.

In FIG. 6, shield 10 is bent into an arch and positioned over the top of plant 16. Rods 11 are bent into right angles about stops 15 and inserted through respective pairs of adjacent rings 14 on opposite edges of shield 10 until stops 15 are engaged against corresponding rings 14. Rods 11 are inserted into the ground close enough together to retain shield 10 in the arch shape.

Figure 7:
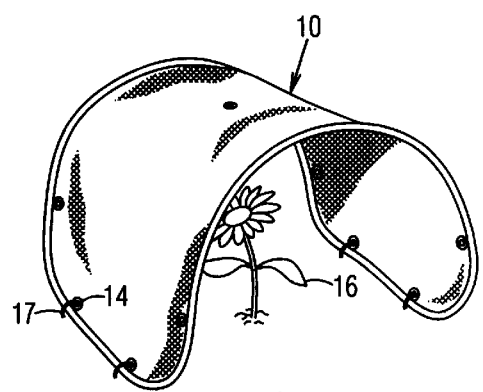
FIG. 7 is a side perspective view of the plant protector in another exemplar installation.

In FIG. 7, shield 10 is bent into an arch and positioned around the top and sides of plant 16. Opposite edges of shield 10 are attached directly to the ground by conventional gardening staples 17 inserted through rings 14.

Although a single plant in shown in the figures, these examples show that the plant protector can be arranged in a variety of shapes and positions for protecting plants in a variety of landscaping and horticultural situations with different space requirements. Many other shapes and positions are possible in addition to the ones shown.

Figure 8:
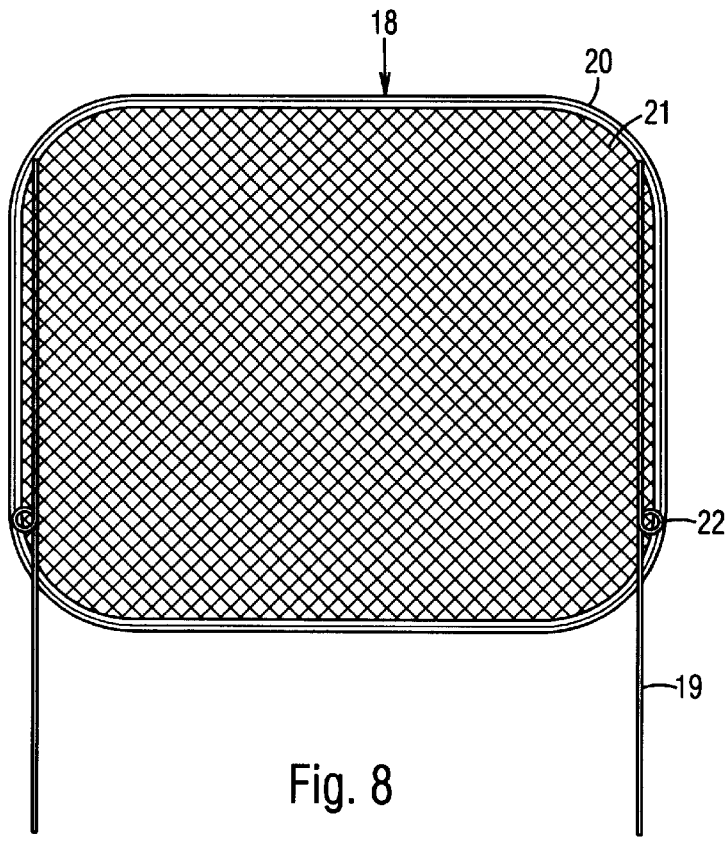
FIG. 8 is a front view of a second embodiment of the plant protector.

FIGS. 8–9:

A second embodiment of the adaptable plant protector is shown in a front view in FIG. 8. It includes a flexible shield 18 and a pair of bendable supporting rods 19. Shield 18 is comprised of a springy frame 20 spanned by a flexible sheet 21. Frame 20 is preferably comprised of a fabric-covered spring rod that springs back to its original shape after being bent or twisted. Sheet 21 is preferably a coarse mesh for passing much light and air, so that it is solely for protecting a plant from animals. The upper ends of bendable supporting rods 19 are removably inserted through the holes in the mesh, and the lower ends are for being inserted into the ground. Rods 19 are preferably made of a material which is relatively easy to bend, but still stiff enough to retain its shape. Each rod 19 is formed with a stop 22 that divides it into upper and lower sections. Stop 22 is larger than the holes in the mesh to support shield 18 off the ground. Stop 22 is preferably provided as a loop with a large enough radius to enable the divided sections of rod 19 to be easily bent about it. Shield 18 can also be arranged in a variety of shapes and positions, including the ones shown in FIGS. 3–7. Shield 18 is also collapsible into a coil for compact shipping and storage.

Figure 9:
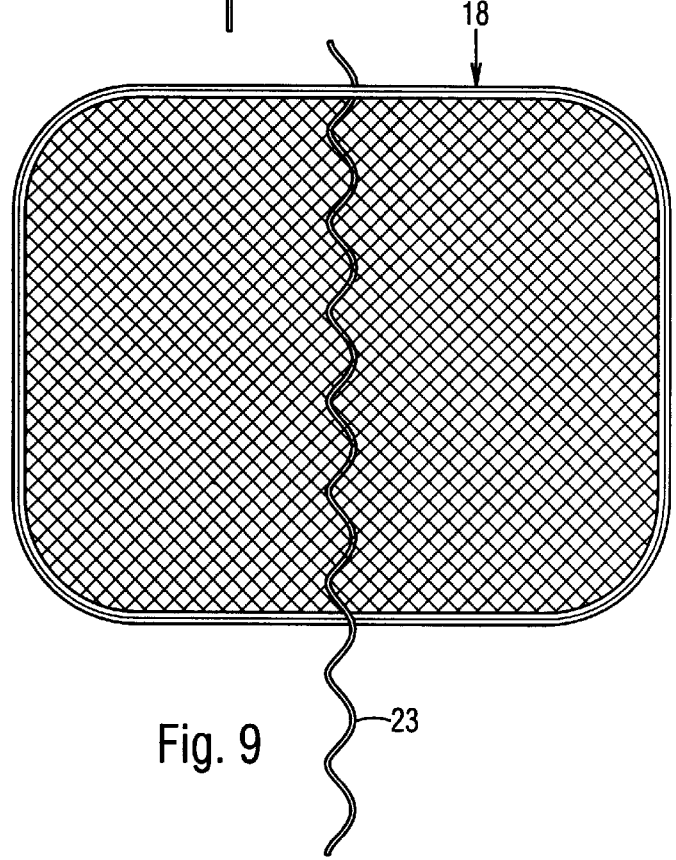
FIG. 9 is a front view of the second embodiment of the plant protector with an alternative spiral supporting rod.

An alternative spiral supporting rod 23 is shown in FIG. 9. Rod 23 is spiraled or screwed into the mesh, and a protruding lower end is for being inserted into the ground.

SUMMARY AND SCOPE

Accordingly, an adaptable plant protector is provided. It protects plants from weather and animals. It is easily mounted in a variety of shapes and positions for protecting plants in a variety of landscaping and horticultural situations. It is also collapsible for compact shipment and storage.

Although the above description is specific, it should not be considered as a limitation on the scope of the invention, but only as an example of the preferred embodiment. Many substitutes and variations are possible within the teachings of the invention. For example, rings 14 may be loops instead of grommets, and may be attached to other positions on shield 10. Instead of integral loops, stops 15 and 22 may be blocks or clips attached to the rods. The springy frame may be of any shape. The spring rod can have a cross section of any shape, such as round, square, flat, etc. Therefore, the scope of the invention should be determined by the appended claims and their legal equivalents, not by the examples given.

I claim:

1. An adaptable plant protector, comprising:

a flexible shield comprising a springy bendable frame spanned by a flexible sheet, and a plurality of rings along each of at least two opposite edges of said frame, said springy bendable frame being bendable into a variety of shapes, twistable into a compact coil for storage, and expandable back into shape for use; and a plurality of bendable rods each comprising a single continuous piece of bendable material, each of said bendable rods having an upper end inserted through at least two of said rings and a lower end for being inserted into the ground, said shield being bendable into said variety of shapes, said shield being supportable in said shapes in a variety of positions when said bendable rods are suitably positioned relative to each other in the ground, bent to suitable angles, and inserted into said rings respectively on said opposite edges of said frame.

2. The adaptable plant protector of claim 1, wherein said flexible sheet is comprised of a mesh pierced with a plurality holes for passing light and air.

3. An adaptable plant protector, comprising:

a flexible shield comprising a springy frame spanned by a mesh, and a plurality of rings positioned adjacent said frame, a substantial surface of said mesh being pierced with holes for passing light and air, said shield being collapsible into a compact size for storage; and attaching means for connecting said rings with ground, said shield being bendable into a variety of shapes and supportable by said attaching means in a variety of positions for protecting plants from weather and animals in a variety of horticultural situations;

wherein said attaching means comprises a plurality of bendable rods each having an upper end inserted through a plurality of said rings and a lower end for being inserted into the ground, said bendable rods each including a stop arranged at an intermediate position thereon, one of said rings resting on said stop so that said shield is supported off the ground, said shield being supported in said variety of shapes and said variety of positions by suitably positioning said bendable rods relative to each other in the ground and bending said bendable rods to suitable angles.

4. An adaptable plant protector, comprising:

a flexible shield comprising a springy frame spanned by a mesh, and a plurality of rings positioned adjacent said frame a substantial surface of said mesh being pierced with holes for passing light and air said shield being collapsible into a compact size for storage; and attaching means for connecting said rings with ground, said shield being bendable into a variety of shapes and supportable by said attaching means in a variety of positions for protecting plants from weather and animals in a variety of horticultural situations;

wherein said attaching means comprises a plurality of bendable rods each having an upper end inserted through a plurality of said rings and a lower end for being inserted into the ground, said bendable rods each including a stop arranged at an intermediate position thereon, one of said rings resting on said stop so that said shield is supported off the ground, said stop comprising an integral loop which enables each of said rods to be easily bent, said shield being supported in said variety of shapes and said variety of positions by suitably positioning said bendable rods relative to each other in the ground and bending said bendable rods to suitable angles about corresponding loops.

5. An adaptable plant protector, comprising:

a flexible shield comprising a springy frame spanned by a mesh, and a plurality of rings positioned adjacent said frame, a substantial surface of said mesh being pierced with holes for passing light and air, said shield being collapsible into a compact size for storage; and attaching means for connecting said rings with ground, said shield being bendable into a variety of shapes and supportable by said attaching means in a variety of positions for protecting plants from weather and animals in a variety of horticultural situations;

wherein said attaching means comprises a plurality of gardening staples each inserted through one of said rings into the ground, said shield being supported in said variety of shapes and said variety of positions by suitably positioning said gardening staples relative to each other in the ground.

6. An adaptable plant protector comprising:

a flexible shield comprising a springy frame spanned by a flexible sheet, and a plurality of rings positioned adjacent said frame said shield being collapsible into a compact size for storage; and a plurality of bendable rods each having an upper end inserted through a plurality of said rings and a lower end for being inserted into a ground, said shield being bendable into a variety of shapes and supportable by said bendable rods in a variety of positions by suitably positioning said bendable rods relative to each other in the ground and bending said bendable rods to suitable angles, said shield for protecting plants from weather and animals in a variety of horticultural situations;

wherein said bendable rods each include a stop arranged at an intermediate position thereon, one of said rings resting on said stop so that said shield is supported off the ground.

7. The adaptable plant protector of claim 6, wherein said stop is comprised of an integral loop which enables each of said rods to be easily bent.

8. An adaptable plant protector, comprising:

a spiral rod; and a flexible shield comprising a springy frame spanned by a mesh, a substantial surface of said mesh being pierced with holes for passing light and air, said holes being large enough to pass said spiral rod, said spiral rod having an upper portion screwed into said mesh and a lower portion for being inserted into a ground, said shield for being positioned adjacent a plant for protecting the plant from weather and animals, said shield being collapsible into a compact size for storage.

* * * * *